(No Model.)
R. C. IRISH.
LOOM TEMPLE
No. 441,666. Patented Dec. 2, 1890.
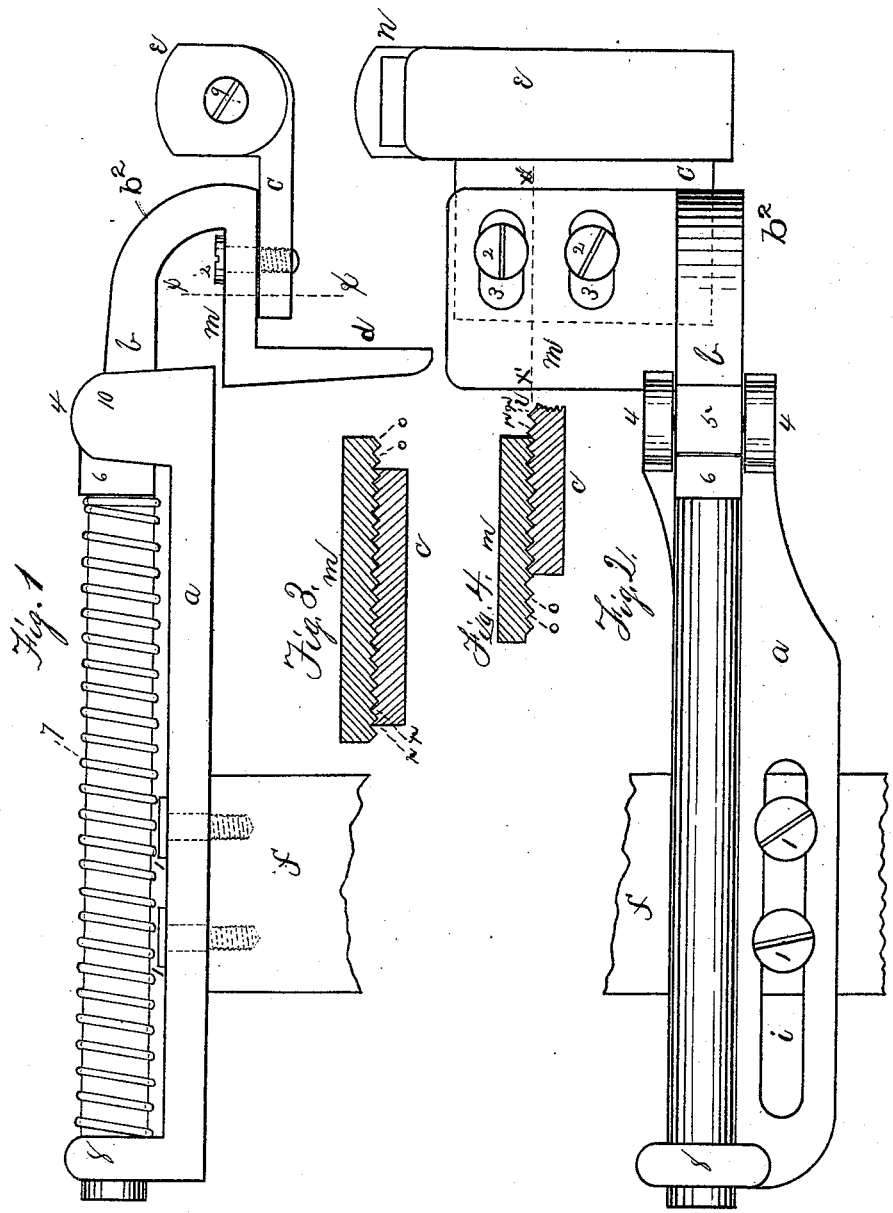
Witnesses.
E. S. Fogg.
E. L. Whitehouse
Inventor.
R. C. Irish
By Winfield Thoale
His Atty.

UNITED STATES PATENT OFFICE.

ROLON C. IRISH, OF AUGUSTA, MAINE, ASSIGNOR TO THE DUTCHER TEMPLE COMPANY, OF HOPEDALE, MASSACHUSETTS.

LOOM-TEMPLE.

SPECIFICATION forming part of Letters Patent No. 441,666, dated December 2, 1890.

Application filed April 29, 1885. Serial No. 163,810. (No model.)

*To all whom it may concern:*

Be it known that I, ROLON C. IRISH, of Augusta, in the county of Kennebec and State of Maine, have invented a new and useful Improvement in Loom-Temples, which improvement is fully set forth in the following specification and accompanying drawings.

This invention has for its object the production of a loom-temple wherein the blow of the lay is received directly upon an integral part or the sliding temple-bar, the roller carrier or head of the temple being adjustably attached to the said sliding shank, so that the position of the head of the shank may be accommodated or adapted to varying widths of lay, as will be described.

My invention is confined especially to that class of roller-temples wherein the bar or shank is surrounded by a spring, the bar or shank sliding or reciprocating longitudinally in a stand which is secured to the breast-beam of a loom.

My improvement in loom-temples consists, essentially, in a sliding bar having integral therewith a buffer and a plate, a stand having bearings to guide the shank of the said bar during its reciprocations, and a spiral spring surrounding the said shank, combined with a temple-cover, a roll, a trough having an attached plate, and means to attach the said plate adjustably to the plate on the sliding bar, as will be described.

Figure 1 is a side elevation of a loom-temple embodying my invention, the drawing showing part of the breast-beam. Fig. 2 is a top or plan view of the temple shown in Fig. 1, the spring being omitted. Fig. 3 is a section in the line $x$, Fig. 1; and Fig. 4, a section in the line $x'$, Fig. 2.

Referring to the drawings, $a$ represents the stand of the temple, slotted at $i$ for the reception of the screws 1, which are employed to secure the said stand in an adjustable manner to the breast-beam $f$.

The stand $a$ has at one end a guiding-lug 8 and at its opposite end a bifurcated lug 4, through which is extended a pin 10, the said pin also passing through a holding-block 5, which acts upon the upper side of the bar or shank $b$ of the temple to keep it down in working position in the stand. The temple bar or shank has a shoulder 6, one side of which abuts against the block 5, the latter constituting a forward stop for the temple-shank. The rear side of the shoulder 6 receives against it one end of a spiral spring 7, which at its opposite end acts against the lug 8 and normally holds the temple-bar forward with the shoulder 6 against the block 5.

The bar or shank $b$, outside the stand $a$, next the lay, (not shown,) is turned downward, as at $b^2$, and then backward, as at $b^3$, and then again downward, as at $d$, there being an open space left between the underside of the bar or shank and the upper side of the portion $b^3$ of such size and shape as to permit the part $b^3$ to slide back underneath the stand when the lay of the loom strikes the part $d$, which constitutes the usual buffer. By reason of this peculiar shape given to the bar or shank it is possible to make the latter very short.

The parts $b^3$ and $d$ referred to are integral with the part $b$ of the bar or shank, and so also the plate $m$, extended from one side of the part $b^3$, is integral therewith. The plate $m$ is slotted, as herein shown, at two places, as at 3, to receive the screws 2, which extend loosely through the said slots and screw into threaded openings in the plate $c$, which serve to confine the said plate $c$ in an adjustable manner to the plate $m$. The plate $c$ has integral with it the trough $n$, which incloses the usual temple-roll, and is provided with the cover $e$, the trough and cover having extended through them the usual longitudinal screw $g$. To aid in securing the plates $c$ and $m$ together in such manner that the temple-trough may always remain at the proper angle with relation to the bar or shank $b$, and to prevent the plates from slipping, both the said plates, where their faces come in contact, may be scored or corrugated, as shown in the drawings. The buffer $d$ being integral with the shank or bar, there is no liability of its becoming loose by reason of the blows of the lay against it, which frequently happens when the buffer is connected with the plate $c$, as heretofore common, for in such case the blow of the lay against the buffer is to be resisted by the screws employed in uniting the buffer to the bar or stand.

In the invention herein described, wherein the blow of the lay is against a buffer formed as an integral part of the bar, the strain upon the screws 2, uniting the plate $c$ of the temple to the plate $m$ of the bar, is very slight, such strain being occasioned solely by the pressure of the cloth upon the roller.

I am aware that a sliding-bar temple, wherein the trough is integral with the bar, has had a buffer integral with it; but in such temple the position of the trough and roll with relation to the bar cannot be adjusted to adapt the roll to the width of the lay and the distance of the reed from the front of the lay, the width of the raceway of the lay being different in different looms.

I do not broadly claim a sliding bar for a temple, nor do I broadly claim a buffer integral therewith, nor do I broadly claim a trough made adjustable upon a part carrying it; but I do claim as follows:

The herein-described temple, consisting of a stand $a$, having bearings, the pin or stop 10, the block 5, the sliding rod $b$, mounted in the said bearings and having a projection 6, a downwardly-extended portion $b^2$, a backwardly-extended portion $b^3$, and a downwardly-extended buffer $d$, all integral with the said bar, a spiral spring surrounding the said bar, the trough having a backwardly-extended plate adjustably bolted to the said extension $b^3$ of the bar, and the cover, the said trough-cover being arranged in front of the bar $b$ and at right angles thereto, the parts being all constructed as shown and described.

ROLON C. IRISH.

Witnesses:
WINFIELD CHOATE,
E. S. FOGG.